US012614835B2

(12) United States Patent
Xing et al.

(10) Patent No.: US 12,614,835 B2
(45) Date of Patent: Apr. 28, 2026

(54) MILLIMETER WAVE ANTENNA CONFIGURATION ASSEMBLY AND MOBILE TERMINAL

(71) Applicant: HUIZHOU TCL MOBILE COMMUNICATION CO., LTD., Huizhou (CN)

(72) Inventors: Hongjuan Xing, Huizhou (CN); Hai Cai, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 182 days.

(21) Appl. No.: 18/262,250

(22) PCT Filed: Feb. 8, 2021

(86) PCT No.: PCT/CN2021/076076

§ 371 (c)(1),
(2) Date: Jul. 20, 2023

(87) PCT Pub. No.: WO2022/156015

PCT Pub. Date: Jul. 28, 2022

(65) Prior Publication Data

US 2024/0120641 A1 Apr. 11, 2024

(30) Foreign Application Priority Data

Jan. 22, 2021 (CN) ......................... 202110086306.3

(51) Int. Cl.
*H01Q 1/24* (2006.01)
*H01Q 1/52* (2006.01)
*H01Q 21/28* (2006.01)

(52) U.S. Cl.
CPC ............. *H01Q 1/243* (2013.01); *H01Q 1/521* (2013.01); *H01Q 21/28* (2013.01)

(58) Field of Classification Search
CPC ........ H01Q 1/243; H01Q 1/242; H01Q 1/241; H01Q 1/521; H01Q 1/12; H01Q 21/28;
(Continued)

(56) References Cited

U.S. PATENT DOCUMENTS 9,350,081 B2 5/2016 Heikura et al.
9,673,507 B2 6/2017 Ramachandran et al.
(Continued)

FOREIGN PATENT DOCUMENTS

CN 104781065 A 7/2015
CN 105226376 A 1/2016
(Continued)

OTHER PUBLICATIONS

WO-2019134497-A1 Translation (Year: 2019).*
(Continued)

*Primary Examiner* — Dameon E Levi
*Assistant Examiner* — Gurbir Singh
(74) *Attorney, Agent, or Firm* — PV IP PC; Wei Te Chung

(57) ABSTRACT

A millimeter wave antenna assembly includes a rear cover; a preset antenna group, provided on a side below the rear cover; a millimeter wave antenna group, provided below the rear cover and adjacent to the preset antenna group, wherein the millimeter wave antenna group and the preset antenna group are spaced apart by a preset distance; a main board, in which the preset antenna group and the millimeter wave antenna group are electrically connected to the main board; and a frame, circumferentially provided around the main board, wherein the rear cover engages with the frame.

8 Claims, 4 Drawing Sheets

(58) Field of Classification Search

CPC ...... H01Q 21/30; H01Q 21/065; H01Q 21/20; H01Q 5/40; H01Q 5/48; H01Q 13/106; H01Q 21/26; H01Q 1/02; H01Q 21/24; H01Q 1/245; H01Q 1/38; H01Q 19/10; H01Q 1/2258; H01Q 1/42; H01Q 1/22; H01Q 1/50; H01Q 21/062; H01Q 9/0414; H01Q 1/36; H01Q 9/0421; H01Q 1/48; H01Q 1/2283; H01Q 9/42; H01Q 5/35

See application file for complete search history.

(56) References Cited

U.S. PATENT DOCUMENTS

| | | | | |
|---|---|---|---|---|
| 9,972,892 | B2 * | 5/2018 | Noori | H01Q 19/10 |
| 2018/0138587 | A1 | 5/2018 | Kim et al. | |
| 2020/0106158 | A1 * | 4/2020 | Gomez Angulo | G06F 1/1698 |

FOREIGN PATENT DOCUMENTS

| | | | | | |
|---|---|---|---|---|---|
| CN | 107887708 | A | | 4/2018 | |
| CN | 108448239 | A | | 8/2018 | |
| CN | 109964367 | A | | 7/2019 | |
| CN | 210897636 | U | | 6/2020 | |
| CN | 111478049 | A | | 7/2020 | |
| CN | 111525276 | A | | 8/2020 | |
| CN | 211428346 | U | | 9/2020 | |
| CN | 112235449 | A | | 1/2021 | |
| EP | 1025619 | A1 | | 8/2000 | |
| EP | 2096711 | A1 | | 9/2009 | |
| EP | 3567849 | A1 | | 11/2019 | |
| JP | 2020022141 | A | | 2/2020 | |
| WO | 2018206116 | A1 | | 11/2018 | |
| WO | WO-2019134497 | A1 | * | 7/2019 | H01Q 1/36 |

OTHER PUBLICATIONS

WO-2019134497-A1 (Year: 2019).*

International Search Report in International application No. PCT/CN2021/076076,mailed on Oct. 12, 2021.

Written Opinion of the International Search Authority in International application No. PCT/CN2021/076076,mailed on Oct. 12, 2021.

Notification to Grant Patent Right for Invention issued in corresponding Chinese Patent Application No. 202110086306.3 dated Mar. 14, 2022, pp. 1-5.

Chinese Office Action issued in corresponding Chinese Patent Application No. 202110086306.3 dated Oct. 9, 2021, pp. 1-8.

* cited by examiner

MILLIMETER WAVE ANTENNA CONFIGURATION ASSEMBLY AND MOBILE TERMINAL

CROSS REFERENCE

This application is a US national phase based upon an International Application No. PCT/CN2021/076076, filed on Feb. 8, 2021, which claims the priority of Chinese Application No. 202110086306.3, filed on Jan. 22, 2021, the disclosures of which are incorporated herein by reference in its entirety.

FIELD OF THE DISCLOSURE

The present disclosure relates to a technical field of mobile terminal communication components, and more particularly to a millimeter wave antenna assembly and a mobile terminal.

BACKGROUND

With rapid development of science and technology, electronic communication devices are constantly updated and iterated. While constantly increasing the screen-to-body ratio to satisfy users' aesthetic needs, more antennas need to be added to meet users' needs on high-speed networks.

In existing arts, millimeter wave communication is to be achieved by mobile terminals in 4G LTE non-standalone (NSA) mode. The difficulty of this technology is that Sub-6G antennas and millimeter wave antennas need to be deployed compatibly. In a traditional view, when a Sub-6G antenna and a millimeter wave antenna are put too close to each other, they will be affected by each other, and the effect of transmission will be degraded. However, when the Sub-6G antenna and the millimeter wave antenna are set far away from each other, the space occupied by them will increase. It is difficult to meet the requirements of a compact design for electronic communication devices.

SUMMARY

In order to solve the problems in the existing arts that the effect of transmission is not good when the Sub-6G antenna and the millimeter wave antenna are deployed together and the space occupied by them is too large for the electronic communication devices, the present disclosure proposes a millimeter wave antenna assembly and a mobile terminal.

The invention is achieved using the following technical solutions:

A millimeter wave antenna assembly, including:

a rear cover;

a preset antenna group, provided below the rear cover and at a side of the rear cover;

a millimeter wave antenna group, provided below the rear cover and adjacent to the preset antenna group, wherein the millimeter wave antenna group and the preset antenna group are spaced by a preset distance;

a main board, in which a shape of the main board corresponds to a shape of the rear cover, and the preset antenna group and the millimeter wave antenna group are electrically connected to the main board; and a frame, circumferentially provided around the main board, wherein the rear cover engages with the frame.

In the millimeter wave antenna assembly, the preset antenna group includes a first preset antenna, the first preset antenna is fixedly arranged at a side of main board in a lengthwise direction of the main board, and the first preset antenna group is arranged close to the frame;

the millimeter wave antenna group includes a first millimeter wave antenna, and the first millimeter wave antenna is fixedly arranged on the main board at a side of the first preset antenna away from the frame; and/or, the preset antenna group includes a second preset antenna, and the second preset antenna is fixedly arranged on the main board at a side of the main board opposite to the side where the first preset antenna is arranged;

the millimeter wave antenna group includes a second millimeter wave antenna, and the second millimeter wave antenna is fixedly arranged on the main board between the second preset antenna and the frame.

In the millimeter wave antenna assembly, a connecting elastic sheet is provided on the main board, and one side of the connecting elastic sheet is electrically connected to the preset antenna group.

In the millimeter wave antenna assembly, a laser-formed wiring is provided at a side of the connecting elastic sheet connected to the preset antenna group, and one side of the laser-formed wiring is electrically connected to the connecting elastic sheet, and the other side of the laser-formed wiring is electrically connected to the preset antenna group; and the laser-formed wiring is arranged around the millimeter wave antenna group.

In the millimeter wave antenna assembly, a side of the laser-formed wiring facing the rear cover is on a same level as a side of the millimeter wave antenna group facing the rear cover.

In the millimeter wave antenna assembly, the connecting elastic sheet abuts on the frame, and the connecting elastic sheet is a component made of a conductive metal material.

In the millimeter wave antenna assembly, the preset antenna group further includes a third preset antenna, a fourth preset antenna, a fifth preset antenna, a sixth preset antenna, a seventh preset antenna, and an eighth preset antenna, and the plurality of preset antennas are evenly distributed below the rear cover.

In the millimeter wave antenna assembly, the rear cover is a glass rear cover.

In the millimeter wave antenna assembly, the preset distance ranges from 0.5 mm to 1.5 mm.

A millimeter wave antenna system, including:

an assembly module, configured to install the millimeter wave antenna system;

a preset antenna module, provided at a side within the assembly module; and a millimeter wave antenna module, provided at a side within the assembly module and adjacent to the preset antenna module, wherein the preset antenna module and the millimeter wave antenna module are spaced by a preset distance.

In the millimeter wave antenna system, the assembly module includes:

a cover module, on which the preset antenna module and the millimeter wave antenna module are arranged;

a main board module, in which a shape of the main board module corresponds to a shape of the cover module; and a protection module, circumferentially provided around the main board module, wherein the cover module engages with the protection module.

In the millimeter wave antenna system, the preset antenna module includes a first preset antenna, the first preset antenna is fixedly arranged at a side of main board module in a lengthwise direction of the main board module, and the first preset antenna is located away from the protection module;

the millimeter wave antenna module includes a first millimeter wave antenna, and the first millimeter wave antenna is fixedly arranged on the main board module at a side of the first preset antenna away from the protection module; and/or, the preset antenna module includes a second preset antenna, and the second preset antenna is fixedly arranged on the main board module at a side of the main board opposite to the side where the first preset antenna is arranged;

the millimeter wave antenna module includes a second millimeter wave antenna, and the second millimeter wave antenna is fixedly arranged on the main board module between the second preset antenna and the protection module.

In the millimeter wave antenna system, an elastic sheet module is provided on the main board module, one side of the elastic sheet module is on the main board module, and the other side of the elastic sheet module is electrically connected to the preset antenna module.

In the millimeter wave antenna system, a laser-formed wiring is provided at a side of the elastic sheet module connected to the preset antenna module, and one side of the laser-formed wiring is electrically connected to the elastic sheet module, and the other side of the laser-formed wiring is electrically connected to the preset antenna module; and the laser-formed wiring is arranged around the millimeter wave antenna module.

In the millimeter wave antenna system, a side of the laser-formed wiring facing the cover module is on a same level as a side of the millimeter wave antenna module facing the cover module.

In the millimeter wave antenna system, the elastic sheet module abuts on the protection module, and the elastic sheet module is a component made of a conductive metal material.

In the millimeter wave antenna system, the preset antenna module further includes a third preset antenna, a fourth preset antenna, a fifth preset antenna, a sixth preset antenna, a seventh preset antenna, and an eighth preset antenna, and the plurality of preset antennas are evenly distributed over the cover module.

In the millimeter wave antenna system, the cover module is a glass rear cover.

In the millimeter wave antenna system, the preset distance ranges from 0.5 mm to 1.5 mm.

A mobile terminal, including the afore-described millimeter wave antenna assembly.

The beneficial effects of this disclosure are described below. The present disclosure provides a millimeter wave assembly. In the millimeter wave assembly, a preset antenna group and a millimeter wave antenna group are provided below a rear cover, and the two groups are adjacent to each other and are spaced by a preset distance. Within the preset distance, the preset antenna group and the millimeter wave antenna group will not be affected by each other, and the space for the arrangement is effectively reduced, facilitating a compact design for an electronic communication device.

BRIEF DESCRIPTION OF THE DRAWINGS

In FIGS. 1 to 7: 100, millimeter wave antenna group; 110, first millimeter wave antenna; 120, second millimeter wave antenna; 200, preset antenna group; 210, first preset antenna; 220, second present antenna; 230, third preset antenna; 240, fourth preset antenna; 250, fifth preset antenna; 260, sixth preset antenna; 270, seventh preset antenna; 280, eighth preset antenna; 300, rear cover; 400, main board; 410, connecting elastic sheet; 420, laser-formed wiring; 430, frame.

DETAILED DESCRIPTION OF PREFERRED EMBODIMENTS

To make the objectives, technical schemes, and effects of the present disclosure more clear and specific, the present disclosure is described in further detail below with reference to the embodiments in accompanying with the appended drawings. It should be understood that the specific embodiments described herein are merely for interpreting the present disclosure and the present disclosure is not limited thereto.

It should be noted that if there is directional indication (e.g., upper, lower, left, right, front, rear and so on) in the embodiments of the present disclosure, the directional indication is merely used to interpret relative positional relationship, motion and the like between the elements (shown in the appended figures) at a specific pattern. The directional indication will change as a change of the pattern.

In addition, if there are terms "first" and "second" involved in describing the embodiments of the present disclosure, the terms "first" and "second" are used for descriptive purposes only and should not be taken to indicate or imply relative importance, or implicitly indicate the indicated number of technical features. Thus, by defining a feature with "first" or "second" may explicitly or implicitly include at least the feature. In addition, the technical solutions of the various embodiments can be combined with each other, but it has to be realizable by a person of ordinary skill in the art. When a combination of technical solutions is contradictory or cannot be realized, it should be considered that this combination of technical solutions is not possible and is not within the scope of protection requested by this application.

In existing arts, millimeter wave communication is to be achieved by mobile terminals in 4G LTE non-standalone (NSA) mode. The difficulty of this technology is that Sub-6G antennas and millimeter wave antennas need to be deployed compatibly. In a traditional view, when a Sub-6G antenna and a millimeter wave antenna are put too close to each other, they will be affected by each other, and the effect of transmission will be degraded. However, when the Sub-6G antenna and the millimeter wave antenna are set far away from each other, the space occupied by them will increase. It is difficult to meet the requirements of a compact design for electronic communication devices.

Figure 3:
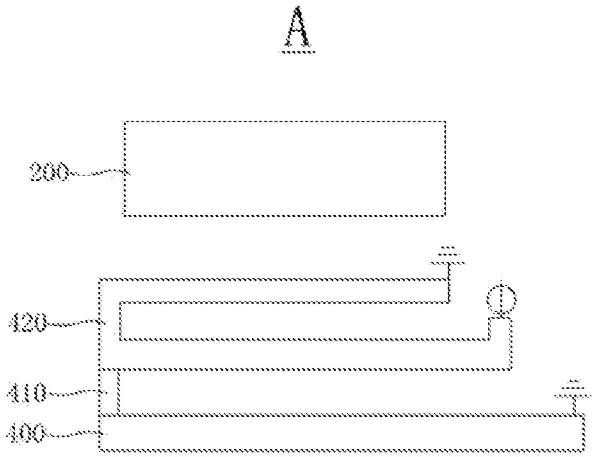
FIG. 3 is a schematic diagram illustrating a structure at node A in a millimeter wave antenna assembly according to the present disclosure.

Based on above problems in the existing arts, as shown in FIG. 3, the present disclosure provides a millimeter wave antenna assembly and a mobile terminal, including: a rear cover 300; a preset antenna group 200, provided below the rear cover 300 and at a side of the rear cover 300; a millimeter wave antenna group 100, provided below the rear cover 300 and adjacent to the preset antenna group 200, wherein the millimeter wave antenna group 100 and the preset antenna group 200 are spaced by a preset distance.

The present disclosure provides the millimeter wave assembly with the preset antenna group 200 and the millimeter wave antenna group 100 that are provided below the rear cover 300, and the two groups are adjacent to each other and are spaced by the preset distance. Within the preset distance, the use of the preset antenna group 200 and the millimeter wave antenna group 100 is not affected, and the space for the arrangement is effectively reduced, facilitating a compact design for an electronic communication device.

Figure 1:
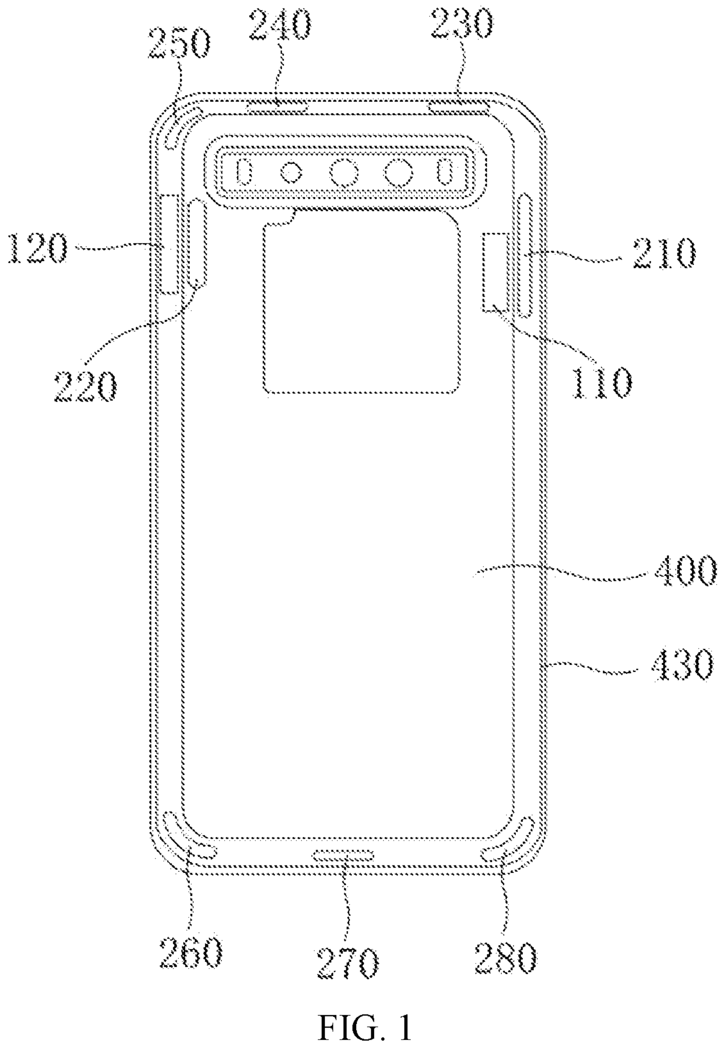
FIG. 1 is a schematic diagram illustrating a layout of a millimeter wave antenna assembly according to the present disclosure.
Figure 2:
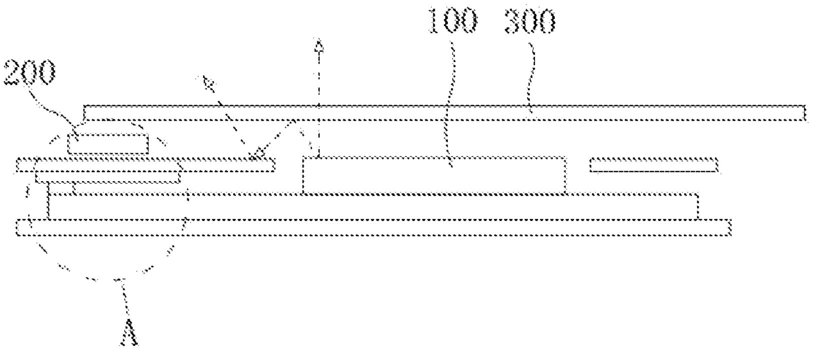
FIG. 2 is a schematic diagram illustrating a cross-sectional structure of a millimeter wave antenna assembly according to the present disclosure.

In above embodiment, it is illustrated by an example of the afore-described millimeter wave antenna assembly applied to a mobile terminal, as shown in FIG. 1 and FIG. 2, the millimeter wave antenna assembly of the mobile terminal of the present disclosure is provided with a main board 400, and a frame 430 circumferentially provided around the main board 400, wherein the frame 430 is disposed around peripheral portions of the main board 400 to cover the main board 400. The frame 430 provided in the present disclosure can protect the main board 400, and meanwhile, it is convenient for the arrangement of the preset antenna group 200 and the millimeter wave antenna group 100.

Corresponding to the afore-mentioned main board 400, the rear cover 300 is also provided above the main board 400. The shape of the rear cover 300 matches the shape of the main board 400. The rear cover 300 is engaged above the main board 400, and an engagement is formed between the rear cover 300 and the frame 430 set around the main board 400. A real part of the mobile terminal is formed once the rear cover 300 cooperates with the main board 400. It is convenient for a user to hold the mobile terminal. It can also realize the protection of the preset antenna group 200 and the millimeter wave antenna group 100 that are disposed on the main board 400 and realize the protection and position limitation of other components arranged on the main board 400, thereby improving the beauty of the mobile terminal.

In above embodiment, the rear cover 300 is a glass rear cover 300. In above embodiment, since the millimeter wave antenna group 100 is realized in 4G LTE non-standalone mode, a decrease in signal loss can be satisfied if the rear cover 300 is made of a non-metallic material. On the other hand, with the advent of 5G technology, a frequency spectrum up to 3 Ghz needs to be used in 5G communication. Since the wavelength of this millimeter wave is quite short, it may cause a severe interference from the metal. As a result, a clean room with at least a distance of 1.5 mm between the main board 400 and the metal material should be kept. When a 5G terminal is blocked by a human hand or metal material, its signals will tend to be generated in a frequency band with the lowest bit error rate. Using the glass rear cover 300 can effectively avoid above problems. It benefits a reduction of required space for the mobile terminal and an improvement on the stability of signals. In actual use, the dielectric constant of the glass is about 7. When millimeter wave signals are to pass through the glass cover, the high dielectric constant will make part of the millimeter wave signals reflected back, and the rest signals will penetrate the glass and be radiated. The entire piece of glass rear cover 300 attenuates the millimeter wave signals by 3-4 dB.

In above embodiment, the main board 400 is also called a mainboard, a system board, or a mother board, and it is one of the most basic and important components of a microcomputer. The main board 400 is generally a rectangular circuit board on which a master circuit system constructing the mobile terminal is installed. Generally, there are a BIOS chip, an I/O control chip, interfaces for switching and controlling a keyboard and a panel, connectors for indication lamps, expansion slots, DC power supply connectors for the main board 400 and plug-in cars, and other components. In this disclosure, the preset antenna group 200 and the millimeter wave antenna group 100 are deployed on the main board 400, and power is supplied to the preset antenna group 200 and the millimeter wave antenna group 100, thereby realizing the working of the preset antenna group 200 and the millimeter wave antenna group 100.

As shown in FIG. 1, in this disclosure, the preset antenna group 200 includes a first preset antenna 210. The first preset antenna 210 is fixedly arranged at a side of main board 400 in a lengthwise direction of the main board 400, and the first preset antenna group 210 is arranged close to the frame 430. Correspondingly, the millimeter wave antenna group 100 includes a first millimeter wave antenna 110. The first millimeter wave antenna 110 is fixedly arranged on the main board 400 at a side of the first preset antenna 210 away from the frame 430. In a practical deployment, the first preset antenna 210 and the first millimeter wave antenna 110 are spaced apart by a preset distance, and the preset distance ranges from 0.5 mm to 1.5 mm.

On the other hand, in order to further ensure the effect of the millimeter wave antenna assembly in the mobile terminal, at the other side of the main board 400, the preset antenna group further includes a second preset antenna 220. A position of the second preset antenna 220 is opposite to a position of the first preset antenna 210 on the main board 400. Meanwhile, the millimeter wave antenna group 100 further includes a second millimeter wave antenna 120. The second millimeter wave antenna 120 is fixedly arranged on the main board 400 between the second preset antenna 220 and the frame 430.

In a practical configuration, two types of millimeter wave antennas, namely N260 and N261, may be adopted for the first millimeter wave antenna 110 and the second millimeter wave antenna 120, where N260 supports a millimeter wave frequency band of 27.5-28.35 GHZ, and N261 supports a millimeter wave frequency band up to 40 GHZ. In the present disclosure, two millimeter wave antennas supporting different frequency bands are arranged at both sides of the main board 400 in the mobile terminal, thereby ensuring the stability of the millimeter wave antenna group 100 of the mobile terminal in actual use.

In contrast to the afore-described millimeter wave antenna assembly, the frequency band supported by the first preset antenna 210 is 1710-2200 MHZ, and the frequency band supported by the second preset antenna 220 is 5150-5925 MHZ.

Specifically, as shown in FIG. 3, a connecting elastic sheet 410 is provided on the main board 400 at a position where the preset antenna group 200 is arranged. One side of the connecting elastic sheet 410 is electrically connected to the preset antenna group 200. The connecting elastic sheet 410 is made of a metal material, preferably, such as silver, copper, and etc., that are conductive metal materials. The electrical connection between the connecting elastic sheet 410 and the main board 400 can realize supplying power to the preset antenna group 200 connected at the other side of the connecting elastic sheet 410. On the other hand, a laser-formed wiring 420 is further provided at a side of the connecting elastic sheet 410 connected to the preset antenna group 200. The laser-formed wiring 420 is an LDS wiring. The LDS wiring is a wiring created on a surface of resin-molded MID by using a three-axis laser. The created wiring is conductive. By electrically connecting the preset antenna assembly via the LDS wiring, supplying power to the preset antenna assembly is achieved.

In above embodiment, formation of the laser-formed wiring 420 includes three steps, i.e., forming, laser process, and electroplating.

Among them, injection molding plays an important role in manufacturing MID successfully, and an enhanced thermoplastic resin rich in special additives is required to facilitate the realization of a reliable LDS process. Usable plastic has capabilities including soldering, plastic soldering, insert molding, over molding and wire bonding.

In the laser processes, it may need to prepare a surface for metal deposition. The laser etches a plastic surface such that LDS catalyst is exposed, and a "coral-like" structure is created, in order to provide a substrate for bonding metal to the plastic.

Electroplating is to plate metal on an external surface of the laser-formed component. This can further improve performance of the laser-formed component on electrical conductivity and reflection of electrical signals.

Based on above embodiment, in a practical use according to the present disclosure, in order to facilitate the understanding of the present disclosure by a person of ordinary skill in the art, it is illustrated by using the first preset antenna 210 and the first millimeter wave antenna 110 in FIG. 1. As shown in FIG. 3, a connecting elastic sheet 410 is provided on the main board 400, and the connecting elastic sheet 410 functions as a backing plate. In addition, a laser-formed wiring 420 is arranged above the connecting elastic sheet 410, and the first preset antenna 210 is arranged above the laser-formed wiring 420. In such a way, transmitting signals by the first preset antenna 210 is achieved. Referring to FIG. 2, the first millimeter wave antenna 110 is located at a side of the first preset antenna 210, and the two antennas are separated by a preset distance. In this configuration, when the millimeter wave antenna works, the generated wave-frequency signals will propagate toward the rear cover 300. Since the rear cover 300 has a certain dielectric constant, it will reflect part of the millimeter wave signals. The path of the reflected signals is shown by a dashed arrow in FIG. 2. The reflected signals are reflected again by the laser-formed wiring 420 provided on the main board 400 such that the returned signals can be reciprocated and finally emitted toward the rear cover 300. Therefore, the millimeter wave antenna assembly of the present disclosure can improve the irradiation of the millimeter wave antenna.

In above embodiment, in order to further improve the transmission of signals of the millimeter wave antenna in the millimeter wave antenna assembly, in an embodiment of the present disclosure, the afore-mentioned laser-formed wiring 420 is arranged around the millimeter wave antenna group 100, that is, in a practical arrangement, the laser-formed wiring 420 is arranged around the first millimeter wave antenna 110 and the second millimeter wave antenna 120. In a practical manufacturing process, the laser-formed wiring 420 can be deployed in a manner of pre-fabrication such that the laser-formed wiring 420 surrounds the first millimeter wave antenna 110 and the second millimeter wave antenna 120, thereby improving the stability of the first millimeter wave antenna 110 and the second millimeter wave antenna 120 in the process of irradiation of signals and minimizing signal loss of attenuated signals.

In another possible implementation of the present disclosure, as shown in FIG. 2, a side of the afore-mentioned laser-formed wiring 420 facing the rear cover 300 is on a same level as a side of the millimeter wave antenna group 100 facing the rear cover 300. The advantage of such a configuration is that on the one hand, the laser-formed wiring 420 surrounds the millimeter wave antenna group 100 to realize the fixing of the millimeter wave antenna group 100, thereby forming a more stable structure and avoiding the detaching of the antennas, caused by collisions of the mobile terminal. On the other hand, Since the laser-formed wiring 420 is on the same level as the millimeter wave antenna group 100 such that the signals irradiated by the millimeter wave antenna group 100 are reflected by the laser-formed wiring line 420, thereby improve, to the greatest extent, the irradiation of the millimeter wave antenna group 100.

The traditional idea about compatible design on antenna is to make the routing of the preset antenna group 200 away from the millimeter wave antenna group 100 by at least 3-4 mm. This is to ensure that the performance of the preset antenna group 200 would not be affected by the millimeter wave antenna group 100, and the irradiated signals of the millimeter wave antenna group 100 would not be affected by the routing of the preset antenna group 200. However, experimental data shows that the performance of the preset antenna group 200 is not affected when the laser-formed wiring 420 in the preset antenna group 200 is 1 mm close to the millimeter wave antenna group 100. On the contrary, the performance of the millimeter wave antenna group 100 is improved because of the reflection made by the laser-formed wiring in the preset antenna group 200. The experimental data are shown in FIGS. 4-7 as follows.

Figure 4:
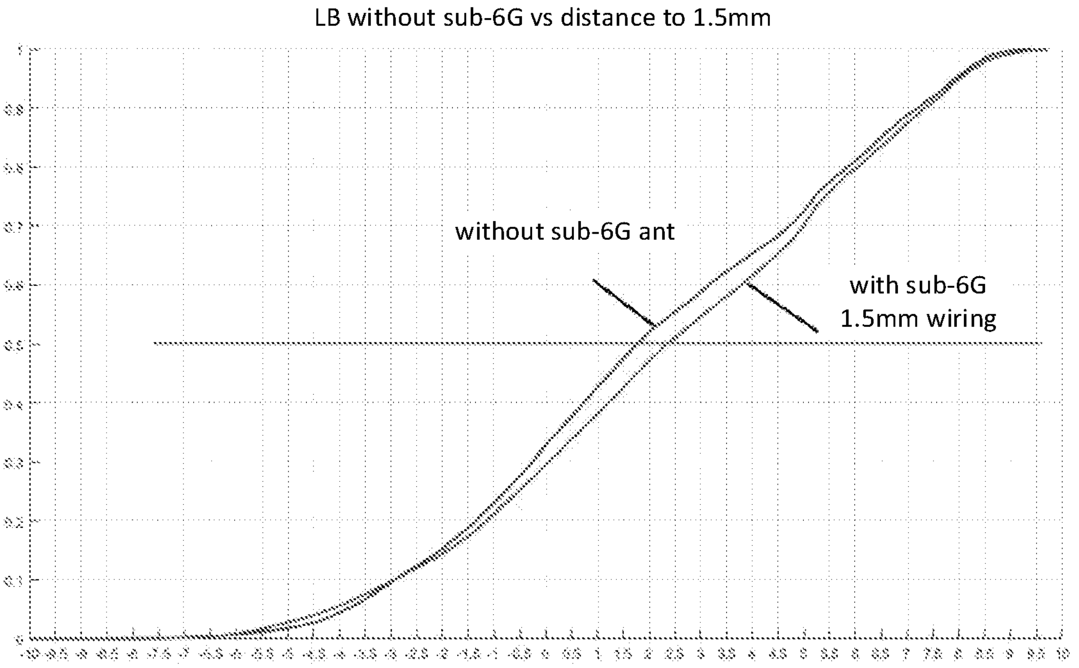
FIG. 4 is a diagram illustrating performance of a N261 millimeter wave antenna with laser-formed wiring applied in a millimeter wave antenna assembly according to the present disclosure.

FIG. 4 is a diagram illustrating performance of a N261 millimeter wave antenna with laser-formed wiring 420 applied in a millimeter wave antenna assembly according to the present disclosure. In this embodiment, the N261 millimeter wave antenna is taken as a subject of the experiment. It can be concluded from this image that when the preset antenna group 200 is applied at a position 1.5 mm away from the millimeter wave antenna group 100 at the time the millimeter wave antenna group 100 starts to emit signals, at 0.5 cdf, the effective isotropic radiated power (EIPR) is improved by 0.5 dB as compared to a situation that the preset antenna group 200 is not applied. It can be seen that the millimeter wave assembly of the present disclosure can realize an improvement of the millimeter wave antenna group 100 in a certain degree.

Figure 5:
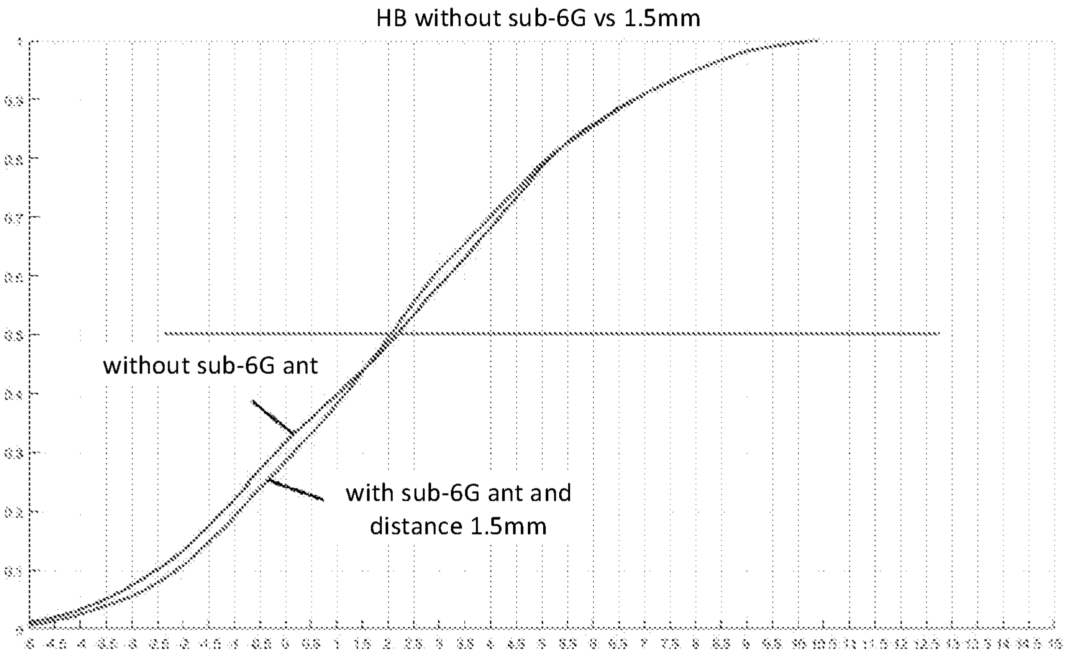
FIG. 5 is a diagram illustrating performance of a N260 millimeter wave antenna with laser-formed wiring applied in a millimeter wave antenna assembly according to the present disclosure.

FIG. 5 is a diagram illustrating performance of a N260 millimeter wave antenna with laser-formed wiring 420 applied in a millimeter wave antenna assembly according to the present disclosure. In this embodiment, the N260 millimeter wave antenna is taken as a subject of the experiment. It can be concluded from this image that when the preset antenna group 200 is applied at a position 1.5 mm away from the millimeter wave antenna group 100 at the time the millimeter wave antenna group 100 starts to emit signals, at 0.5 cdf, the effective isotropic radiated power (EIPR) is slightly lowered as compared to a situation that the preset antenna group 200 is not applied, but the difference therebetween is not significant. It can be seen that the millimeter wave assembly of the present disclosure has little influence on the N260 millimeter wave antenna.

From above experimental data, it can be concluded that although in the millimeter wave assembly of the present disclosure the preset antenna component and the millimeter wave antenna component are arranged at a relatively close distance, it does not actually affect the work of the millimeter wave antenna component. Instead, it improves the transmission of signals of the millimeter wave antenna component in a certain degree.

In order to study the influence of the distance between the millimeter wave antenna component and the preset antenna component on the performance of the millimeter wave antenna, the present disclosure further observe the improvements made when the laser-formed wiring 420 of the preset antenna component cooperates with different types of millimeter wave antenna components at different distances. The resulting data is shown in FIG. 6 and FIG. 7 as below.

Figure 6:
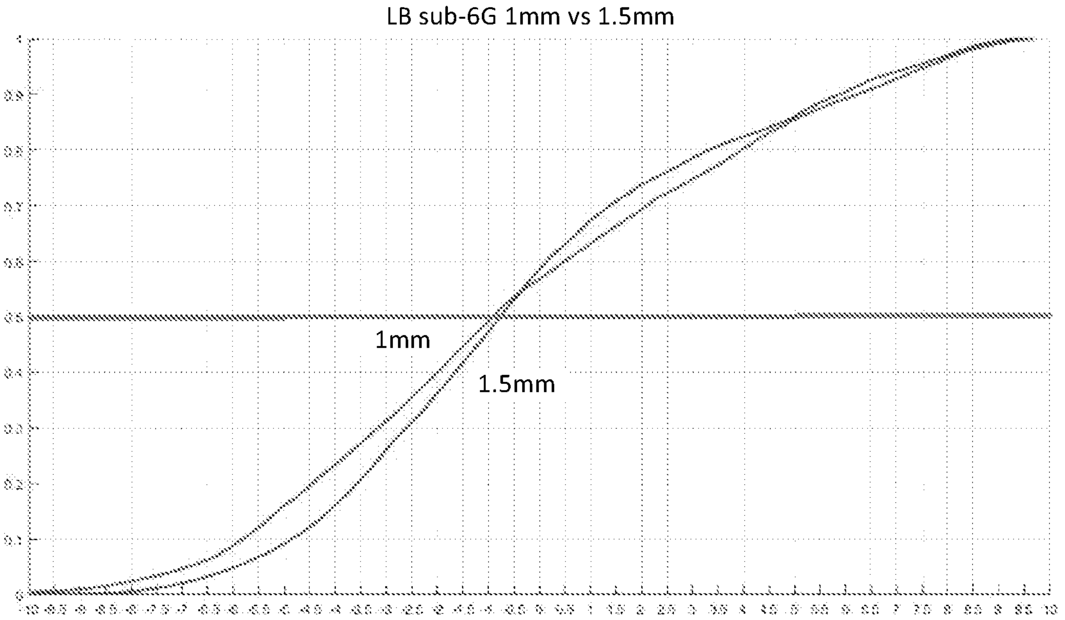
FIG. 6 is a diagram illustrating performance of a N261 millimeter wave antenna with laser-formed wiring applied at different distances to the N261 millimeter wave antenna in a millimeter wave antenna assembly according to the present disclosure.

FIG. 6 is a diagram illustrating performance of a N261 millimeter wave antenna with laser-formed wiring 420 applied at different distances to the N261 millimeter wave antenna in a millimeter wave antenna assembly according to the present disclosure. In this embodiment, the N261 millimeter wave antenna is taken as a subject of the experiment, and the laser-formed wiring 420 is applied by default to obtain the data from 1 mm distance between the laser-formed wiring 420 and the millimeter wave antenna component and the data from 1.5 mm distance between the laser-formed wiring 420 and the millimeter wave antenna component. It can be concluded from this image that the effect therebetween is basically the same at 0.5 cdf, the effective isotropic radiated power (EIPR) of the millimeter wave antenna with the 1.5 mm distance has a great improvement when it is lower than 0.5 cdf, and the EIPR of the millimeter wave antenna with the 1 mm distance has a great improvement when it is higher than 0.5 cdf.

Figure 7:
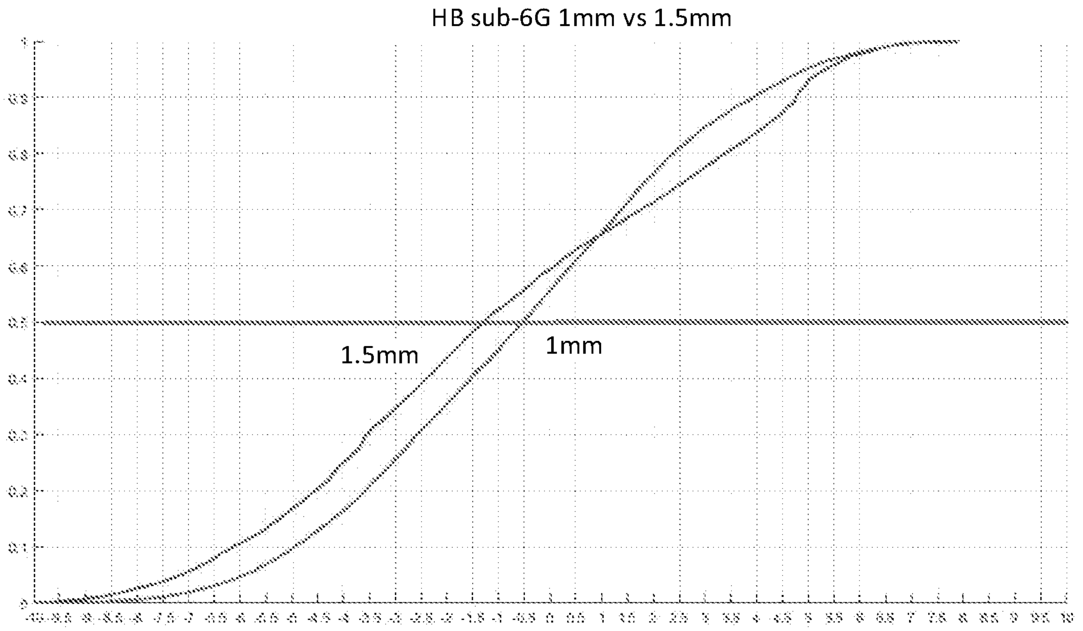
FIG. 7 is a diagram illustrating performance of a N260 millimeter wave antenna with laser-formed wiring applied at different distances to the N260 millimeter wave antenna in a millimeter wave antenna assembly according to the present disclosure.

FIG. 7 is a diagram illustrating performance of a N260 millimeter wave antenna with laser-formed wiring 420 applied at different distances to the N260 millimeter wave antenna in a millimeter wave antenna assembly according to the present disclosure. In this embodiment, the N260 millimeter wave antenna is taken as a subject of the experiment, and the laser-formed wiring 420 is applied by default to obtain the data from 1 mm distance between the laser-formed wiring 420 and the millimeter wave antenna component and the data from 1.5 mm distance between the laser-formed wiring 420 and the millimeter wave antenna component. It can be concluded from this image that at 0.5 cdf, the effective isotropic radiated power (EIPR) of the millimeter wave antenna with the 1 mm distance greatly exceeds the EIPR of the millimeter wave antenna with the 1.5 mm distance.

Based on the conclusion from above experiments, the transmission power of signals of the millimeter wave antenna can be improved as long as the millimeter wave antenna component is separated from the laser-formed wiring 420 of the preset antenna component by 1 mm distance or so in a practical arrangement.

In another possible implementation of the present disclosure, as shown in FIG. 1, the preset antenna group 200 on the afore-mentioned main board 400 further includes a third preset antenna 230, a fourth preset antenna 240, a fifth preset antenna 250, a sixth preset antenna 260, a seventh preset antenna 270, and an eighth preset antenna 280, and the afore-mentioned antennas are evenly distributed below the rear cover 300 at various positions close to the frame 430.

Specifically, the frequency ranges supported by the preset antennas of the preset antenna group 200 are listed as follows:

the first preset antenna 210: 1710-2200 MHZ;
the second preset antenna 220: 5150-5925 MHZ;
the third preset antenna 230: 3550-3700 MHZ;
the fourth preset antenna 240: 5150-5925 MHZ;
the fifth preset antenna 250: 1.575 GHZ;
the sixth preset antenna 260: 3550-3700 MHZ;
the seventh preset antenna 270: 3550-3700 MHZ; and
the eighth preset antenna 280: 3550-3700 MHZ.

All of the afore-described preset antennas are Sub-6G antennas and support 4×4 MIMO.

In the millimeter wave antenna assembly of the present disclosure, a preset antenna group 200 and a millimeter wave antenna group 100 are provided below a rear cover 300, and the two groups are adjacent to each other and are spaced by a preset distance. Within the preset distance, the use of the preset antenna group 200 and the millimeter wave antenna group 100 is not affected, and the space for the arrangement is effectively reduced, facilitating a compact design for an electronic communication device.

Based on above embodiment, the present disclosure further provides a mobile terminal. The mobile terminal includes the millimeter wave assembly described in above embodiment. The millimeter wave assembly includes a rear cover; a preset antenna group, provided below the rear cover and at a side of the rear cover; and a millimeter wave antenna group, provided below the rear cover and adjacent to the preset antenna group, wherein the millimeter wave antenna group and the preset antenna group are spaced by a preset distance.

In a practical use according to the mobile terminal of the present disclosure, after the millimeter wave antenna assembly is arranged, it is illustrated by using the first preset antenna and the first millimeter wave antenna in FIG. 1. As shown in FIG. 3, a connecting elastic sheet is provided on the main board, and the connecting elastic sheet functions as a backing plate. In addition, a laser-formed wiring is arranged above the connecting elastic sheet, and the first preset antenna is arranged above the laser-formed wiring. In such a way, transmitting signals by the first preset antenna is achieved. Referring to FIG. 2, the first millimeter wave antenna is located at a side of the first preset antenna, and the two antennas are separated by a preset distance. In this configuration, when the millimeter wave antenna works, the generated wave-frequency signals will propagate toward the rear cover. Since the rear cover has a certain dielectric constant, it will reflect part of the millimeter wave signals. The path of the reflected signals is shown by a dashed arrow in FIG. 2. The reflected signals are reflected again by the laser-formed wiring provided on the main board such that the returned signals can be reciprocated and finally emitted toward the rear cover. Therefore, the millimeter wave antenna assembly of the present disclosure can improve the irradiation of the millimeter wave antenna.

Based on above embodiment, the present disclosure further provides a millimeter wave antenna system, including:

an assembly module, configured to install the millimeter wave antenna system;

a preset antenna module, provided at a side within the assembly module; and a millimeter wave antenna module, provided at a side within the assembly module and adjacent to the preset antenna module, wherein the preset antenna module and the millimeter wave antenna module are spaced by a preset distance.

In the millimeter wave antenna system, the assembly module includes:

a cover module, on which the preset antenna module and the millimeter wave antenna module are arranged;

a main board module, in which a shape of the main board module corresponds to a shape of the cover module; and a protection module, circumferentially provided around the main board module, wherein the cover module engages with the protection module.

In the millimeter wave antenna system, the preset antenna module includes a first preset antenna, the first preset antenna is fixedly arranged at a side of main board module in a lengthwise direction of the main board module, and the first preset antenna is located away from the protection module;

the millimeter wave antenna module includes a first millimeter wave antenna, and the first millimeter wave antenna is fixedly arranged on the main board module at a side of the first preset antenna away from the protection module; and/or, the preset antenna module includes a second preset antenna, and the second preset antenna is fixedly arranged on the main board module at a side of the main board opposite to the side where the first preset antenna is arranged;

the millimeter wave antenna module includes a second millimeter wave antenna, and the second millimeter wave antenna is fixedly arranged on the main board module between the second preset antenna and the protection module.

In the millimeter wave antenna system, an elastic sheet module is provided on the main board module, one side of the elastic sheet module is on the main board module, and the other side of the elastic sheet module is electrically connected to the preset antenna module.

In the millimeter wave antenna system, a laser-formed wiring is provided at a side of the elastic sheet module connected to the preset antenna module, and one side of the laser-formed wiring is electrically connected to the elastic sheet module, and the other side of the laser-formed wiring is electrically connected to the preset antenna module; and the laser-formed wiring is arranged around the millimeter wave antenna module.

In the millimeter wave antenna system, a side of the laser-formed wiring facing the cover module is on a same level as a side of the millimeter wave antenna module facing the cover module.

In the millimeter wave antenna system, the elastic sheet module abuts on the protection module, and the elastic sheet module is a component made of a conductive metal material.

In the millimeter wave antenna system, the preset antenna module further includes a third preset antenna, a fourth preset antenna, a fifth preset antenna, a sixth preset antenna, a seventh preset antenna, and an eighth preset antenna, and the plurality of preset antennas are evenly distributed over the cover module.

In the millimeter wave antenna system, the cover module is a glass rear cover.

In the millimeter wave antenna system, the preset distance ranges from 0.5 mm to 1.5 mm.

In the millimeter wave antenna system of the present disclosure, a preset antenna module and a millimeter wave antenna module are provided in an assembly module, and the two are adjacent to each other and are spaced by a preset distance. Within the preset distance, the use of the preset antenna module and the millimeter wave antenna module is not affected, and the space for the arrangement is effectively reduced, facilitating a compact design for an electronic communication device.

Based on above embodiment, the present disclosure further provides a mobile terminal. The mobile terminal includes a rear cover; a preset antenna group, provided below the rear cover and at a side of the rear cover; a millimeter wave antenna group, provided below the rear cover and adjacent to the preset antenna group, wherein the millimeter wave antenna group and the preset antenna group are spaced by a preset distance; a main board, in which a shape of the main board corresponds to a shape of the rear cover, and the preset antenna group and the millimeter wave antenna group are electrically connected to the main board; and a frame, circumferentially provided around the main board, wherein the rear cover engages with the frame. The present disclosure provides a millimeter wave assembly. In the millimeter wave assembly, a preset antenna group and a millimeter wave antenna group are provided below a rear cover respectively, and the two are adjacent to each other and are spaced by a preset distance, within the preset distance, the use of the preset antenna group and the millimeter wave antenna group is not affected, the arrangement space is effectively reduced, facilitating compact design of an electronic communication device.

Above all, the present disclosure provides a millimeter wave assembly, a millimeter wave antenna system, and a mobile terminal. In the millimeter wave assembly, a preset antenna group and a millimeter wave antenna group are provided below a rear cover, and the two groups are adjacent to each other and are spaced by a preset distance. Within the preset distance, the use of the preset antenna group and the millimeter wave antenna group is not affected, and a space for the arrangement is effectively reduced, facilitating compact design of an electronic communication device.

It should be understood that the applications of the present disclosure are not limited to above embodiments, and those of ordinary skill in the art may make improvements or variations according to above illustration, but all such improvements and variations should be within the appended claims of the present disclosure.

What is claimed is:

1. A millimeter wave antenna assembly, comprising:

a rear cover;

a preset antenna group, provided below the rear cover and at a side of the rear cover;

a millimeter wave antenna group, provided below the rear cover and adjacent to the preset antenna group, wherein the millimeter wave antenna group and the preset antenna group are spaced by a preset distance;

a main board, in which the preset antenna group and the millimeter wave antenna group are electrically connected to the main board; and a frame, circumferentially provided around the main board, wherein the rear cover engages with the frame;

wherein a connecting elastic sheet is provided on the main board, and one side of the connecting elastic sheet is electrically connected to the preset antenna group;

wherein a laser-formed wiring is provided at a side of the connecting elastic sheet connected to the preset antenna group, and one side of the laser-formed wiring is electrically connected to the connecting elastic sheet, and the other side of the laser-formed wiring is electrically connected to the preset antenna group; and the laser-formed wiring is arranged around the millimeter wave antenna group;

wherein a surface of the laser-formed wiring facing the rear cover is on a same level as a side of the millimeter wave antenna group facing the rear cover;

wherein the preset antenna group comprises a first preset antenna, the first preset antenna is fixedly arranged at a side of main board in a lengthwise direction of the main board, and the first preset antenna is arranged closer to the frame than the millimeter wave antenna group;

the millimeter wave antenna group comprises a first millimeter wave antenna, and the first millimeter wave antenna is fixedly arranged on the main board at a side of the first preset antenna away from the frame; and the preset antenna group comprises a second preset antenna, and the second preset antenna is fixedly arranged on the main board at a side of the main board opposite to the side where the first preset antenna is arranged;

the millimeter wave antenna group comprises a second millimeter wave antenna, and the second millimeter wave antenna is fixedly arranged on the main board between the second preset antenna and the frame.

2. The millimeter wave antenna assembly according to claim 1, wherein the preset antenna group further comprises a third preset antenna, a fourth preset antenna, a fifth preset antenna, a sixth preset antenna, a seventh preset antenna, and an eighth preset antenna, and the plurality of preset antennas are evenly distributed below the rear cover.

3. The millimeter wave antenna assembly according to claim 1, wherein the rear cover is a glass rear cover.

4. The millimeter wave antenna assembly according to claim 1, wherein the preset distance ranges from 0.5 mm to 1.5 mm.

5. A millimeter wave antenna system, comprising:

an assembly module, comprising a rear cover;

a preset antenna module, provided at a side within the assembly module;

a millimeter wave antenna module, provided at a side within the assembly module and adjacent to the preset antenna module, wherein the preset antenna module and the millimeter wave antenna module are spaced by a preset distance; and a main board module, wherein the preset antenna group and the millimeter wave antenna group are electrically connected to the main board module, wherein a shape of the main board module corresponds to a shape of the rear cover, wherein a connecting elastic sheet is provided on the main board module, and one side of the connecting elastic sheet is electrically connected to the preset antenna group;

wherein a laser-formed wiring is provided at a side of the connecting elastic sheet connected to the preset antenna group, and one side of the laser-formed wiring is electrically connected to the connecting elastic sheet, and the other side of the laser-formed wiring is electrically connected to the preset antenna group; and the laser-formed wiring is arranged around the millimeter wave antenna group;

wherein a surface of the laser-formed wiring facing the rear cover is on a same level as a side of the millimeter wave antenna group facing the rear cover;

wherein the preset antenna module comprises a first preset antenna, the first preset antenna is fixedly arranged at a side of main board module in a lengthwise direction of the main board module, and the first preset antenna is located close to the protection module;

the millimeter wave antenna module comprises a first millimeter wave antenna, and the first millimeter wave antenna is fixedly arranged on the main board module at a side of the first preset antenna away from the protection module; and the preset antenna module comprises a second preset antenna, and the second preset antenna is fixedly arranged on the main board module at a side of the main board opposite to the side where the first preset antenna is arranged;

the millimeter wave antenna module comprises a second millimeter wave antenna, and the second millimeter wave antenna is fixedly arranged on the main board module between the second preset antenna and the protection module.

6. The millimeter wave antenna system according to claim 5, wherein the preset antenna module further comprises a third preset antenna, a fourth preset antenna, a fifth preset antenna, a sixth preset antenna, a seventh preset antenna, and an eighth preset antenna, and the plurality of preset antennas are evenly distributed over the cover module.

7. The millimeter wave antenna system according to claim 5, wherein the preset distance ranges from 0.5 mm to 1.5 mm.

8. A mobile terminal, comprising the millimeter wave antenna assembly according to claim 1.

* * * * *